E. E. ALLBEE & G. E. HULSE.
HOSE COUPLING.
APPLICATION FILED NOV. 16, 1904.
1,000,570.
Patented Aug. 15, 1911.
2 SHEETS—SHEET 1.
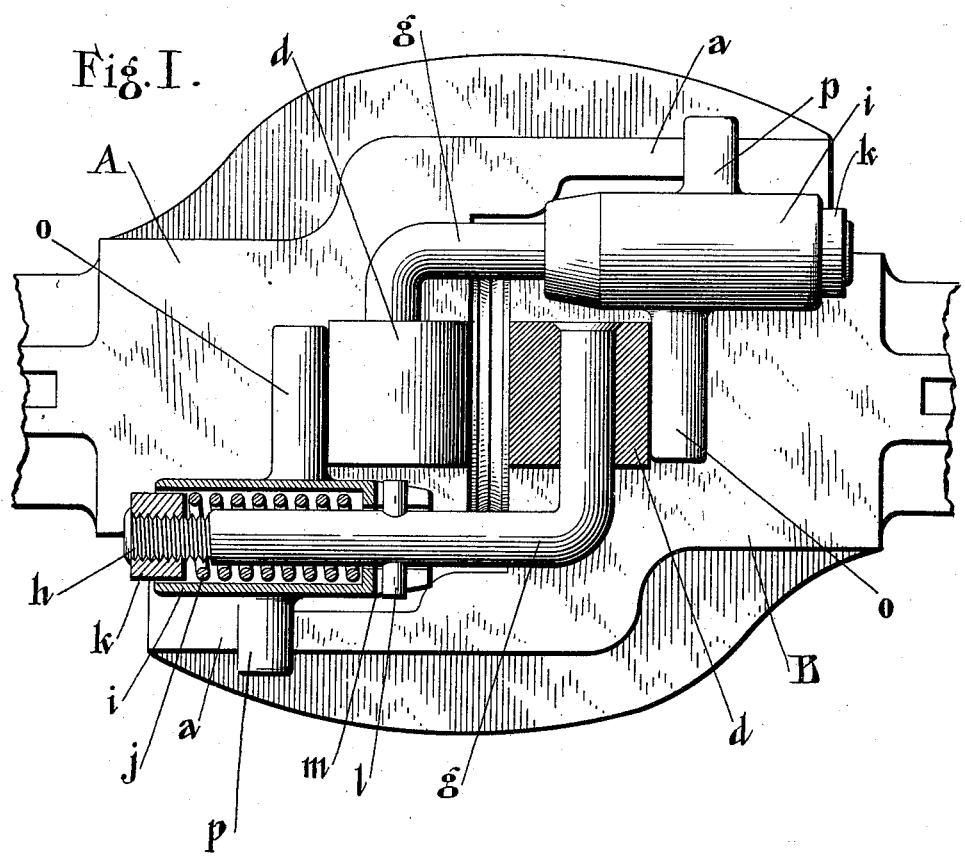
Fig. I.
WITNESSES:
INVENTORS
ATTORNEY E. E. ALLBEE & G. E. HULSE.
HOSE COUPLING.
APPLICATION FILED NOV. 16, 1904.
1,000,570.
Patented Aug. 15, 1911.
2 SHEETS—SHEET 2.
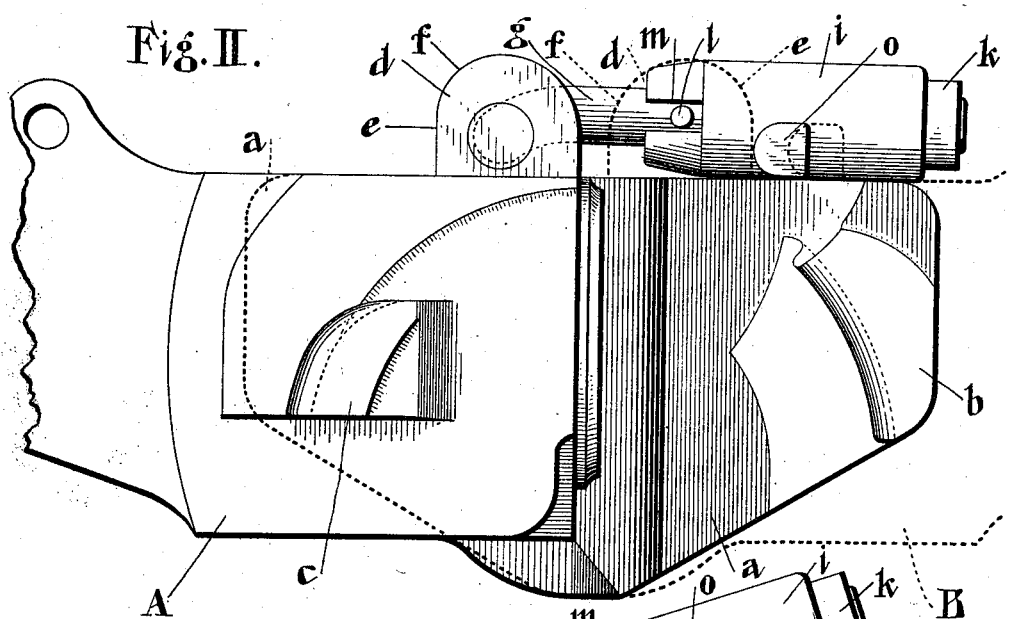
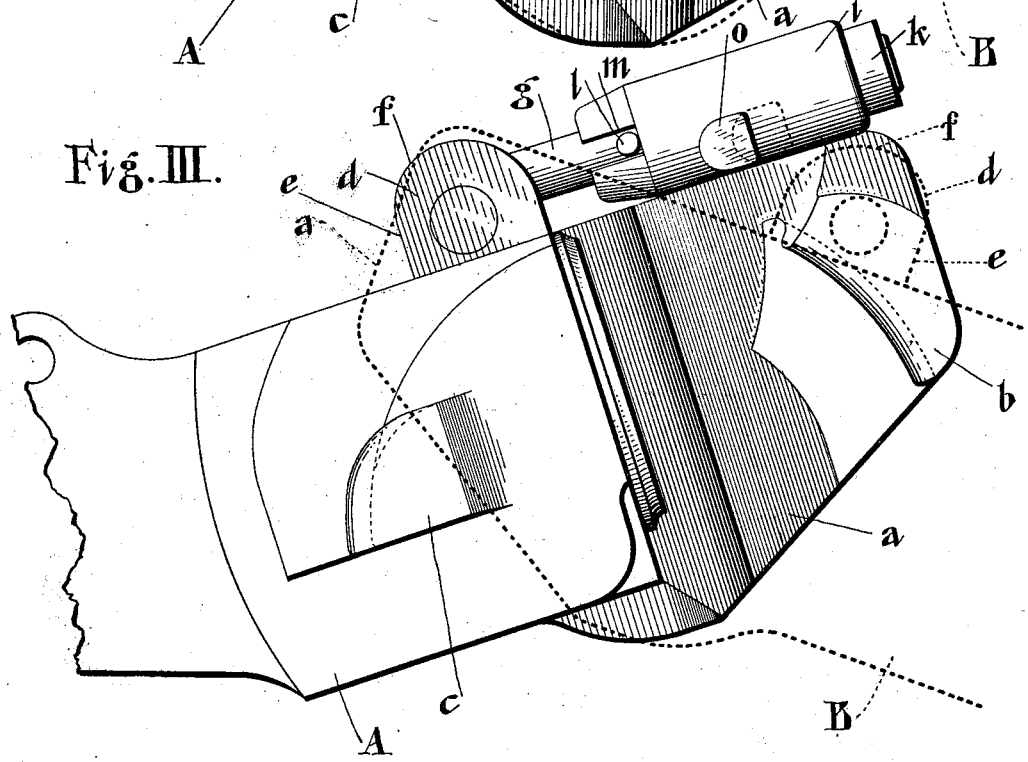

UNITED STATES PATENT OFFICE.

ELMER E. ALLBEE, OF ARLINGTON, NEW JERSEY, AND GEORGE E. HULSE, OF AMITYVILLE, NEW YORK, ASSIGNORS TO THE SAFETY CAR HEATING & LIGHTING COMPANY, A CORPORATION OF NEW JERSEY.

HOSE-COUPLING.

1,000,570.  Specification of Letters Patent.  Patented Aug. 15, 1911.

Application filed November 16, 1904.  Serial No. 232,976.

*To all whom it may concern:*

Be it known that we, ELMER E. ALLBEE, residing at Arlington, in the county of Hudson and State of New Jersey, and GEORGE E. HULSE, residing at Amityville, in the county of Suffolk and State of New York, have invented a new and useful Improvement in Hose-Couplings, of which the following is a specification.

Our invention relates to hose couplings and has for its object to produce a hose coupler in which the members may be readily locked together and also a hose coupling in which the members while locked together may be readily separated by raising the hose coupling as would occur, for instance, in the event of the train breaking apart.

In the accompanying drawings one form of our invention is illustrated and a specific description will be made thereof with the understanding that the invention is not limited but it is desired to include within the terms of our claims such analogous structure as may be equivalent thereof within the limitations imposed by the state of the art.

In the drawing:—Figure I is a plan view partly in section of the coupler embodying our invention the section being taken through one of the coupling lugs or bosses and the spring casing; Fig. II is a side elevation of one of the coupler members the other being shown in dotted lines and all the parts in the position which they assume when the coupler members are coupled; Fig. III is a similar view showing the parts in the act or at the instant of uncoupling.

In the drawing; A indicates one coupler member and B the other coupler member. These coupler members are preferably similar in construction and are shown in the present instance as of the straight port type. Each coupler member is also shown as provided with a side arm and web $a$ carrying an under-cut engaging member $b$; the body being provided with a complemental lug $c$. The elements $b$, $c$, constitute means for engaging the coupler members with each other and disengaging them from each other operative through relative rocking movements of the parts in the plane of a longitudinal axis. In addition to these engaging and disengaging means the coupler heads are each provided with means for locking parts together which said means are preferably of the form shown or some equivalent thereof. We have shown by way of example certain spring locking means which will now be described.

Each of the coupler heads carries a suitable lug or boss $d$ having preferably a vertical engaging surface or shoulder $e$ and a curved or inclined cam surface $f$. Journaled in this lug or boss is a swinging angular arm $g$ which is herein shown as screw threaded at its free end $h$. Surrounding the end of the angular arm $g$ is a spring casing $i$ containing a spring $j$ which bears at one end against a wall of the spring casing and at the other end against a nut $k$, a cross head $l$ on the arm $g$ fitting in the slotted end $m$ of casing. This casing $i$ carries a pin $o$ having a curved or cam surface to coöperate with the face $e$, $f$, of the boss $d$. The cam face of this pin is preferably of semi-circular form. The sleeve or spring casing $i$ also preferably carries a pin $p$ adapted to rest upon the web $a$ of the coupler heads A, B.

In coupling the coupler heads together the coupling or engaging and disengaging means are first engaged as indicated in Figs. I, and II and thereupon the locking means are brought into engagement by swinging the arms $g$ so as to bring the pin $o$ behind the bosses or lugs $d$, as shown in Figs. I, and II, the spring $j$ permitting the spring casing or sleeve to slide slightly for that purpose. The semi-circular engaging face of the pin $o$ brings the stress of the locking device in a straight line and tends to oppose any movement of the couplers which would cause them to disengage under the conditions of use and takes up for wear of the gasket.

The coupling of the coupler heads will be readily understood. Let us, for instance, take into consideration the automatic uncoupling upon the breaking apart of the train. It will be understood that when the coupler heads are coupled in their normal position they will hang substantially horizontally as shown in Fig. II. If the train should now pull apart the first effect would be to straighten out the coupler which has been hanging in a catenary curve and to bring the coupler heads into an inclined position such, for instance, as shown in Fig. III. As the coupler heads commence to swing or rock in a vertical plane or the plane of their longitudinal axis the web $a$ of each coupler head will raise the pin $p$ and thereby swing the arms $g$ and ride the cam pin $o$ upon the working face of the boss $d$ and automatically unlock the coupling, the disengagement of the coupling being effected in the usual manner by the disengagement of the ledge $b$ from the lug $c$.

Having described our invention, what we claim and desire to secure by Letters Patent is:—

1. In combination with the two parts of a hose coupling and means for engaging and disengaging them, of an auxiliary locking member provided with a spring exerting its stress in the direction of the axis of the coupling, said locking member being adapted to uncouple automatically.

2. The combination with the two parts of a hose coupling and means for engaging and disengaging them, of a locking means embodying in its structure an auxiliary swinging spring actuated lock exerting its stress in the direction of the axis of the coupler.

3. The combination with the two parts of a hose coupling and means for engaging and disengaging the same, of a swinging locking device provided with an auxiliary spring actuated cam means for effecting locking and resisting unlocking.

4. The combination with the two parts of a hose coupling and means for engaging and disengaging them operative through relative rocking movements of the parts in the plane of their longitudinal axis, of auxiliary swinging spring controlled locking mechanism adapted to resist such relative rocking movements.

5. The combination with the two parts of a hose coupling and means for engaging and disengaging them operative through relative rocking movements of the parts in the plane of their longitudinal axis, of swinging longitudinally yielding locking mechanism adapted to resist such relative rocking movement and embodying in its structure means by which a movement of uncoupling will automatically unlock the locking means.

6. The combination with the two parts of a hose coupling and means for engaging and disengaging them operative through relative rocking movements of the parts in the plane of their longitudinal axis, of swinging locking mechanism adapted to resist such relative rocking movement and provided with means whereby the said locking mechanism will be automatically unlocked upon the occurrence of a movement of the parts of the couplers in the act of uncoupling.

7. The combination with the two parts of a hose coupling and means for engaging and disengaging them, of a locking mechanism comprised by an auxiliary swinging yielding hook and an abutment with which said hook engages.

8. The combination with the two parts of a hose coupling and means for engaging and disengaging them operative through relative rocking movements of the parts in the plane of their longitudinal axis, of an auxiliary swinging locking mechanism which, when swung into locking position, is adapted to oppose such relative rocking movement, said locking mechanism being comprised in part by a yielding hook and an abutment with which said hook engages.

9. The combination with the two parts of a hose coupling and means for engaging and disengaging them adapted to be automatically operated, of a locking mechanism comprised in part by a hook, an abutment with which said hook is adapted to engage and an extensible spring interposed in the body portion of the hook.

10. In combination, a hose coupling comprising two mating parts, each of which is provided with means to engage the other thereof, and auxiliary longitudinally yielding locking means supported upon one of said parts adapted to interlock with coacting means upon the other of said parts.

11. In combination with the mating sections of a hose coupling and their engaging means, a longitudinally extensible locking device movably supported upon each of said sections adapted to interlock with coöperating means upon the opposite section.

12. In combination, a hose coupling comprising two mating sections, each of which is provided with freely attachable and detachable interengaging means, and a swingable longitudinally yielding locking device upon each of said sections adapted to interlock with the other of said sections, said locking devices being unlockable upon the relative rocking movement of said sections.

13. In combination, a hose coupling comprising two mating sections each of which is provided with means whereby said sections may be freely connected and disconnected, and a swinging longitudinally yielding locking device upon each of said sections adapted to interlock with the other of said sections, and means upon each of said locking devices adapted to be engaged by the section with which it is locked upon a relative movement of said sections, such engagement effecting the unlocking of the locking devices.

14. In a hose coupling comprised by two mating members provided with interengaging means, the combination of a projection upon one of said members and a movable yielding locking device upon the other thereof which, when locked over said projection, effectuates the locking together of said members.

15. In a hose coupling comprised by two mating members provided with interengaging means, the combination of a projection upon one of said members, a yielding locking device movably mounted upon the other thereof which, when locked over said projection, effectuates the locking together of said members, and means upon said locking device adapted to be engaged by a portion of the member with which it is locked upon the relative movement of the coupling members and to be unlocked thereby.

16. In a hose coupling comprised by two mating members provided with interengaging means, the combination of a projection upon each of said members and a pair of longitudinally yielding locking devices, one of which is movably mounted upon each coupling member, each of said locking devices being adapted to interlock with the projection upon the opposite coupling member, and means upon each of said locking devices adapted to be engaged by a portion of the coupling member with which it is locked upon a relative locking movement of the coupler sections, whereby both rocking devices are disengaged.

17. In combination, a hose coupling comprising a pair of mating sections provided with freely connectible and separable interengaging means, a pair of swinging locking devices, one upon each section, adapted to lock with the opposite section, and a spring combined with each of said locking devices to permit a longitudinal extension or retraction thereof.

18. In combination, a hose coupling comprising a pair of mating sections provided with freely connectible and separable interengaging means, a pair of locking devices each comprised by a pair of relatively movable members capable of extension or retraction, and a spring for controlling the movements thereof, and projections upon each of said sections with which the locking device upon the opposite section locks.

19. In combination, a hose coupling comprising a pair of mating sections provided with freely connectible and separable interengaging means, a pair of locking devices, one for each section, each locking device being comprised by a pair of relatively movable members capable of longitudinal retraction or extension and a spring for controlling the movements thereof, and a projection upon each of said sections with which the locking device upon the opposite section locks, each of said locking devices being provided with means which when relative movement between the sections takes place is engaged by the section by which it is carried and is thereby disengaged from said projection.

20. A direct port gravity hose coupler for railway cars, having a locking arm on one side and a locking projection on the opposite side, adapted to couple with its reciprocal coupler by a downward swinging movement and to automatically uncouple with an upward swinging movement, caused by the tightening of the hose as the cars draw apart, combined with auxiliary longitudinally extensible locking means arranged to resist a movement toward uncoupling, and having means adapted to engage and unlock said auxiliary locking means upon an upward movement of said coupler member.

21. A direct port gravity hose coupler for railway cars, having a locking arm on one side and a locking projection on the opposite side, adapted to couple with its reciprocal coupler by a downward swinging movement and to automatically uncouple with an upward movement, caused by the tightening of the hose as the cars draw apart, combined with auxiliary locking means arranged to resist a movement toward uncoupling, and a laterally extending projection upon said auxiliary locking means which is adapted to be engaged by the locking arm of a coupler member carrying the auxiliary locking means, whereby the latter is moved to an unlocking position during the upward swinging movement of the coupler members.

22. A direct port gravity hose coupler for railway cars, having a locking arm on one side and a locking projection on the opposite side, adapted to couple with its reciprocal coupler by a downward swinging movement and to automatically uncouple with an upward swinging movement, caused by the tightening of the hose as the cars draw apart, combined with auxiliary locking means adapted to resist a movement toward uncoupling, and a lug upon said auxiliary locking means which is adapted to be engaged by the locking arm of the coupler member carrying the auxiliary locking means, whereby the latter is moved to an unlocking position during the upward swinging movement of the coupler members.

23. The combination with the two parts of a hose coupling and means for engaging and disengaging them adapted to be automatically operated, of an auxiliary locking mechanism comprising a member upon one of said parts adapted to lock with a member upon the other of said parts and to share with said engaging means the longitudinal pull exerted on said two parts, said first member being formed and adapted, upon relative movement of said two parts, to be engaged by the part by which it is carried whereby it is disengaged from said second member.

E. E. ALLBEE.
GEORGE E. HULSE.

Witnesses:
A. C. MOORE,
EDW. C. SOFIO.